June 25, 1929.  C. JUNGERS  1,718,824

ROLLED SHEET GLASS

Filed March 4, 1927

INVENTOR
Clement Jungers
BY
ATTORNEY

Patented June 25, 1929.

1,718,824

UNITED STATES PATENT OFFICE.

CLEMENT JUNGERS, OF SERGEANT, PENNSYLVANIA.

ROLLED SHEET GLASS.

Application filed March 4, 1927. Serial No. 172,810.

The present invention is concerned with the provision of a rolled sheet glass which has all of the translucent quality of ordinary frosted or stippled glass, and yet which may embody various integral distinctive and sharply defined designs simulating panelling or cut work.

Preferably the main body of the sheet has a frosted or stippled light diffusing surface while the design is formed by relatively plain surfaced grooves in the frosted surface of the sheet. These grooves being of general V-shape in cross section present light refracting surfaces so that the sheet is entirely non-transparent and yet shows relatively light and dark areas formed by the grooved and frosted portions respectively.

Many unusually attractive designs may be had by various arrangements of grooving, the grooves showing sharp high lights and shadows which contrast with the uniformly dull frosted areas of the sheet surface.

I thus produce a glass which is entirely translucent, yet which is of a strikingly ornamental and unusual appearance due to the combination of the two means for rendering it translucent, in other words, the attenuating light diffusing and light refracting areas.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
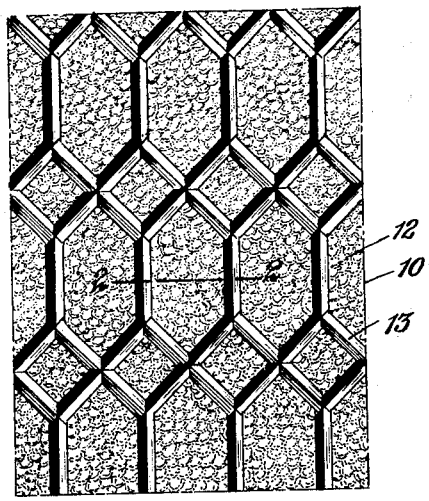
Fig. 1 is a fragmentary plan view of a sheet of rolled glass showing several repeats of a grooved design.
Figure 2:
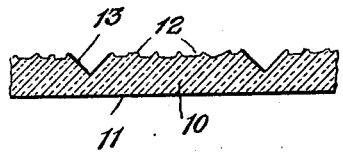
Fig. 2 is a transverse sectional view on the line 2—2 of Fig. 1, the size of the grooves and the depth of the stippling being somewhat exaggerated for the sake of clearness.

In the drawings I have used the reference character 10 to designate a sheet of rolled glass, one surface 11 of which is plain and flat, and the other surface 12 of which is frosted or stippled in any convenient or convenient manner as by the production of pits therein. These pits or depressions are formed in the usual manner by the die table on which the molten glass is rolled flat, and serve to render the glass translucent due to its light diffusing stippled or frosted surface.

As thus far described the glass may be entirely conventional, the present invention being primarily concerned with the provision of the design forming V-shaped grooves 13 in the surface 12 of the sheet. These grooves are not light diffusive, but their flat, preferably right angularly converging walls are light refractive. The grooving also produced by the die table during the rolling operation may take any conventional or original symmetric or asymmetric design. As illustrated it is used to form a regular series of overlapping or interlaced irregular hexagons, the overlapping portions of which define squares and smaller irregular hexagons.

When the glass is viewed from any angle with a light behind it or in front of it, the design formed by the grooves is quite conspicuous and sharply defined. The shiny flat light refractive surfaces of the grooves contrast sharply with the relatively dull light diffusive stippled or frosted areas between the grooves. Opposite walls of the grooves themselves present alternating high lights and shadows under many light conditions, and when observed at various angles. Every change of the angle of observation and every change of lighting seems to give the glass a different appearance, yet the design always remains clearly defined.

Obviously various changes and alterations might be made in the general form and arrangement of the parts described without departing from the invention. Hence I do not wish to limit myself to the details set forth, but shall consider myself at liberty to make such changes and alterations as fall within the spirit and scope of the appended claims.

I claim:

1. Rolled sheet glass having a flat surface and a frosted surface, and having a series of flat surfaced relatively deep grooves of V shape in cross section forming outline designs on the frosted side thereof.

2. A translucent rolled sheet glass having a frosted light diffusive surface intersected by relatively deep light refractive grooves forming outline designs therein.

3. A translucent rolled sheet glass having a design formed therein by alternating light diffusing and light refracting surface areas.

4. A translucent rolled sheet glass one surface having relatively deep V shaped design forming grooves therein, the walls of which are light refractive, said surface between the grooves being of a light diffusing character.

CLEMENT JUNGERS.